United States Patent
Salada et al.

(10) Patent No.: US 11,068,059 B2
(45) Date of Patent: Jul. 20, 2021

(54) HAPTIC INTERFACE FOR USER INPUT DEVICE

(71) Applicant: Apple Inc., Cupertino, CA (US)

(72) Inventors: Mark A. Salada, Sunnyvale, CA (US); Michael Beyhs, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/383,411

(22) Filed: Apr. 12, 2019

(65) Prior Publication Data

US 2021/0018982 A1 Jan. 21, 2021

Related U.S. Application Data

(60) Provisional application No. 62/657,290, filed on Apr. 13, 2018.

(51) Int. Cl.
 *G06F 3/01* (2006.01)
 *H01F 7/06* (2006.01)
 (Continued)

(52) U.S. Cl.
 CPC ............ *G06F 3/016* (2013.01); *H01F 7/064* (2013.01); *H01F 7/20* (2013.01); *H01F 27/2804* (2013.01);
 (Continued)

(58) Field of Classification Search
 CPC . G06F 3/016; G06F 3/041; H01F 7/20; H01F 27/2804; H01F 27/36; H01F 2027/2809
 See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| CN | 101593020 A | 12/2009 |
| CN | 206115389 U | 4/2017 |

(Continued)

OTHER PUBLICATIONS

Hashizume, Satoshi et al., "Cross-Field Haptics: Multiple Direction Haptics Combined with Magnetic and Electrostatic Fields," 2017 IEEE World Haptics Conference (WHC), Dec. 31, 2017, pp. 370-375.

(Continued)

*Primary Examiner* — Peter D McLoone
(74) *Attorney, Agent, or Firm* — Kubota & Basol LLP

(57) ABSTRACT

Disclosed herein is a dynamically shapeable haptic interface, which can include a drive mechanism, a tactile mechanism, and a display. The display can emit light towards the drive mechanism in the form of image(s). The emitted light can activate a plurality of switches located between coil(s) included in the drive mechanism and the display. The plurality of switches, when activated, can allow current(s), supplied by a source, to pass through the coil(s). The current passing through the coils can create magnetic fields. The magnetic fields can collectively form a magnetic profile. The magnetic profile can cause the tactile mechanism to render shape(s) on the surface of the haptic interface. The tactile mechanism can include magnetic component(s), such as ferrous particles, magnets, and/or magnetic pins. The magnetic component(s) can move based on the magnetic profile and, along with one or more layers of material, can render the shape(s).

19 Claims, 13 Drawing Sheets

(51) Int. Cl.
*H01F 7/20* (2006.01)
*H01F 27/36* (2006.01)
*H01F 27/28* (2006.01)
*G06F 3/041* (2006.01)

(52) U.S. Cl.
CPC .............. *H01F 27/36* (2013.01); *G06F 3/041* (2013.01); *H01F 2027/2809* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,211,775 | B1* | 4/2001 | Lee .................. G08B 6/00 340/407.1 |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,703,924 | B2 | 3/2004 | Tecu et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 8,866,774 | B2 | 10/2014 | Leem et al. |
| 9,417,697 | B2 | 8/2016 | Lee et al. |
| 10,613,678 | B1* | 4/2020 | Sen .................. G06F 3/016 |
| 2006/0197753 | A1 | 9/2006 | Hotelling |
| 2010/0308983 | A1* | 12/2010 | Conte .................. G06F 3/044 340/407.2 |
| 2014/0062682 | A1* | 3/2014 | Birnbaum ............ G08B 6/00 340/407.2 |
| 2015/0116231 | A1* | 4/2015 | Kim .................. G06F 3/016 345/173 |
| 2016/0011684 | A1 | 1/2016 | Zhang |
| 2016/0299602 | A1* | 10/2016 | Shuster ............... H04L 67/10 |
| 2018/0096570 | A1* | 4/2018 | Khoshkava ........... G08B 6/00 |
| 2019/0101986 | A1* | 4/2019 | Khoshkava ........... G06F 3/016 |
| 2020/0089360 | A1* | 3/2020 | Sen .................... G06F 3/04886 |

FOREIGN PATENT DOCUMENTS

| | | |
|---|---|---|
| CN | 107015643 A | 8/2017 |
| DE | 102017004105 A1 | 11/2017 |
| EP | 3176676 A1 | 6/2017 |
| JP | 2000-163031 A | 6/2000 |
| JP | 2002-342033 A | 11/2002 |
| KR | 10-2011-0127341 A | 11/2011 |
| WO | 2018/042300 A1 | 3/2018 |

OTHER PUBLICATIONS

Lu, Xiong et al., "Haptic Rendering Methods for Natural Human-Computer Interaction: A Review," *Chinese Journal of Scientific Instrument*, vol. 38, No. 10, Oct. 31, 2017, pp. 2391-2399.

Utility Model Patentability Evaluation Report received for Chinese Utility Model Patent No. ZL201920491212.2, mailed on Apr. 2, 2020, 6 pages (3 pages of English Translation and 3 pages of Official Copy).

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

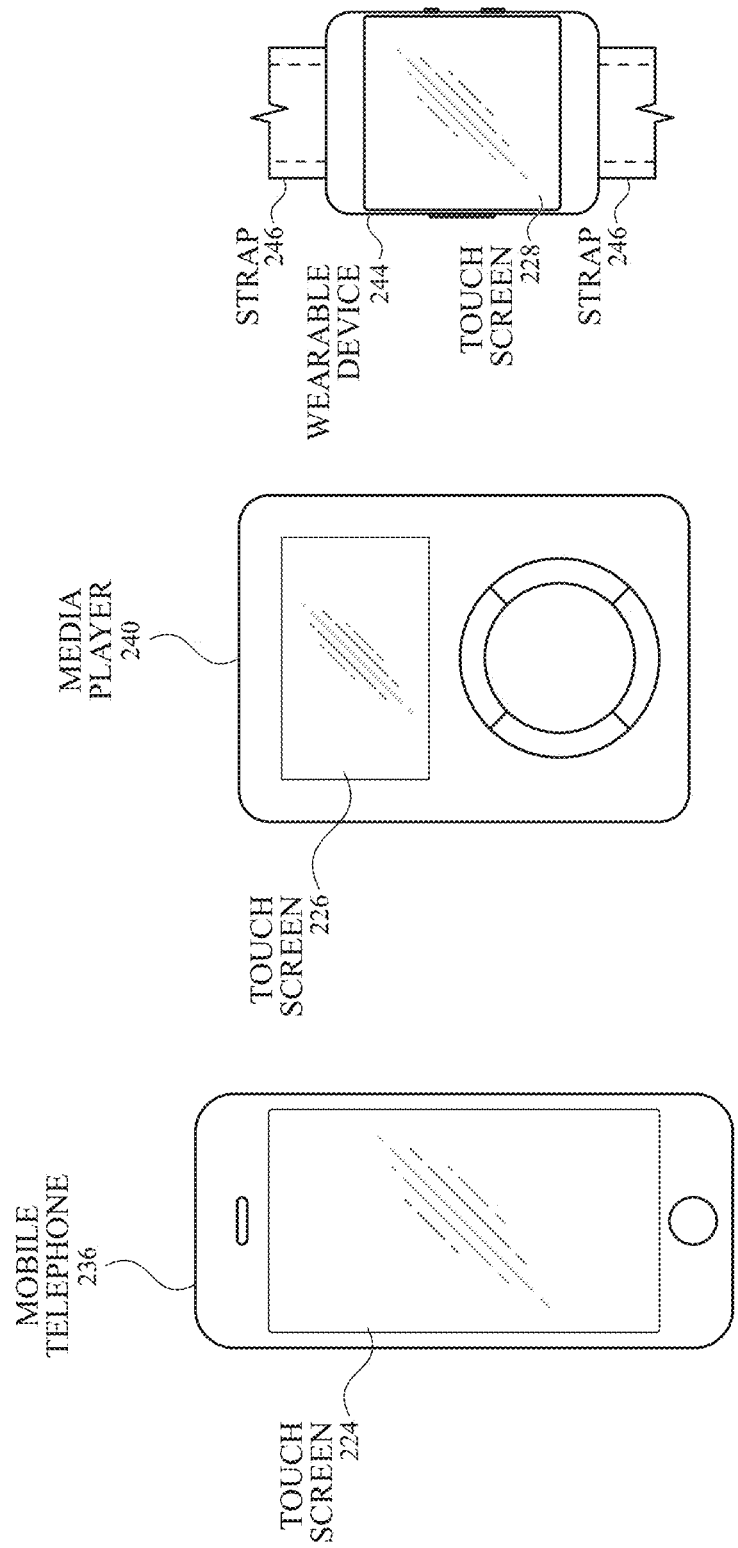

HAPTIC INTERFACE FOR USER INPUT DEVICE

CROSS REFERENCE TO RELATED APPLICATION

This application claims the benefit under 35 U.S.C. § 119(e) of U.S. Provisional Patent Application No. 62/657,290, filed Apr. 13, 2018; the content of which is incorporated by reference herein in its entirety for all intended purposes.

FIELD

This relates generally to a device that generates a haptic interface, and more specifically, to a full-page refreshable and dynamically shapeable display.

Virtual reality (VR) technology can be used for many applications such as military training, educational learning, and video games. VR technology can use one or more electronic devices to simulate a virtual environment and the user's physical presence in that virtual environment. One type of VR technology is augmented reality (AR) technology, where the user's real environment can be supplemented with computer-generated objects or content. Another type of VR technology is mixed reality (MR) technology, where the user's real environment and the virtual environment can be blended together.

VR/AR/MR technology can be simulated using one or more electronic devices. One electronic device can be a VR headset, where the user can use the VR headset to see the simulated virtual environment. As the user moves his or her head to look around, a display included in the headset can update the viewed environment to reflect the user's head movement. Another electronic device can include one or more cameras. The one or more cameras can be used to capture the user's real environment in AR technology and/or can be used for positional tracking. Yet another electronic device can include VR gloves. VR gloves can be worn over the user's hands and can allow the user to touch, feel, and hold virtual objects in real-time. The VR/AR/MR system can further include a host device, which can be used to convey one or more images to the user.

SUMMARY

Disclosed herein is a dynamically shapeable haptic interface. The device that generates a haptic interface can include a drive mechanism, a tactile mechanism, and a display. The display can be configured to emit light towards the drive mechanism in the form of one or more images. The emitted light can activate a plurality of switches located between one or more coils included in the drive mechanism and the display. The plurality of switches, when activated, can allow one or more currents to pass through the coils. The current can be supplied by a source. The current passing through the coils can create magnetic fields. The magnetic fields can collectively form a magnetic profile generated by the drive mechanism. The magnetic profile can cause the tactile mechanism to render one or more shapes on the surface of the haptic interface. The tactile mechanism can include one or more magnetic components, such as ferrous particles, magnets, and/or magnetic pins. The one or more magnetic components can move based on the magnetic profile and, along with one or more layers of material, can render the one or more shapes.

BRIEF DESCRIPTION OF THE DRAWINGS

FIGS. 2A-2C illustrate systems in which examples of the disclosure can be implemented.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples. Numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Representative applications of the apparatus and methods according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Figure 1:
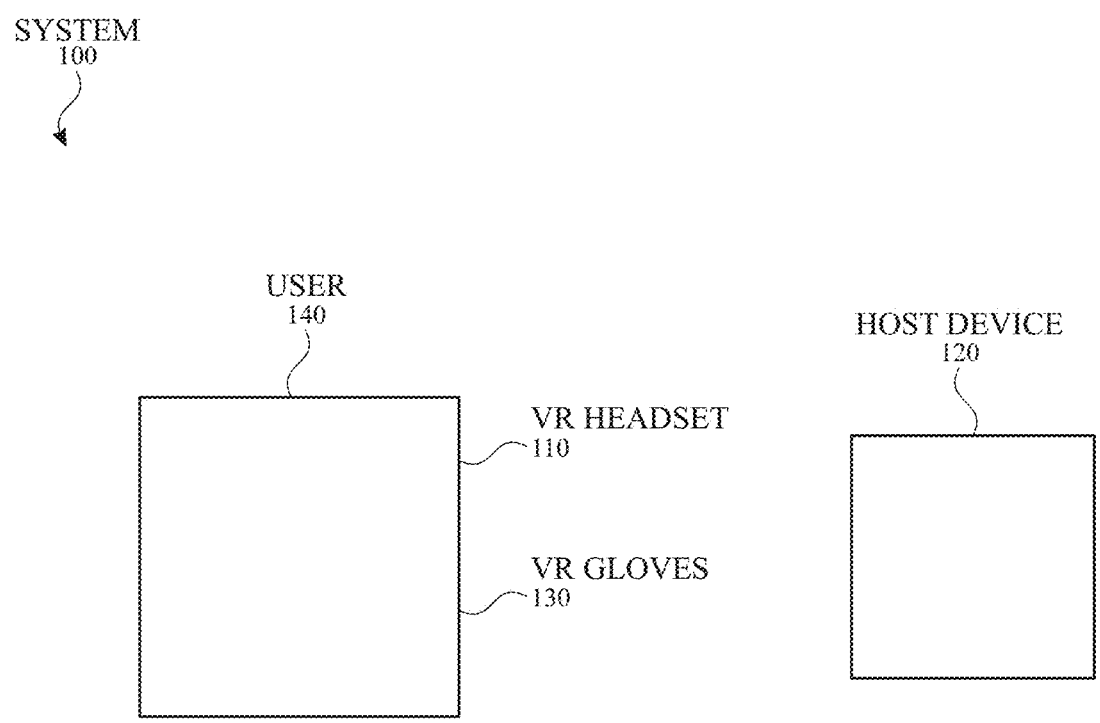
FIG. 1 illustrates an exemplary VR system according to examples of the disclosure.

FIG. 1 illustrates an exemplary VR system 100 according to examples of the disclosure. The VR system 100 can include a VR headset 110, VR gloves 130, and a host device 120. The VR headset 110 and the VR gloves 130 can be attached to a user. The VR headset 110 can be positioned such that at least its display is positioned in front of the eyes of the user 140. The VR headset 110 can be configured to display the simulated virtual environment to the user 140. As the user 140 moves his or her head to look around, a display included in the VR headset 110 can update the viewed environment to reflect the user's movement. For example, if the user 140 moves his or her head down, the display can show the ground to the user 140.

The host device 120 can include an electronic device, such as a personal computer, a mobile telephone, and/or a wearable device. The host device 120 can communicate with one or more components included in the VR system 100. For example, the host device 120 can store one or more environments (e.g., the room of the simulated environment that the user is located in) and can transmit the information about the environment to the VR headset 110. In some examples, the host device 120 can include one or more components that convey information to the user 140 via means additional or alternative to a visual display. For example, the host device 120 can convey information to the user 140 through a haptic interface where the user 140 can physically sense the information.

Examples of the disclosure are directed to a device that generates a haptic interface (e.g., a three-dimensional profile that can be sensed across the surface of the device) that conveys information to a user through physical senses. The device can be a full-page refreshable shape display capable of being dynamically refreshed when automatically or when input is received by a user. The device can be a tactile display. Alternatively, the device can be an accessory that attaches to another device having a display. The received input can be transmitted by way of a slider, knob, click, touch input, button, or etc. The term "device," as used throughout the disclosure can refer to a stand-alone device that generates a haptic interface or one that includes an accessory for generating a haptic interface.

FIGS. 2A-2C illustrate devices having a display in which examples of the disclosure can be implemented. FIG. 2A illustrates an exemplary mobile telephone 236 that can include a touch screen 224, which can include a display. FIG. 2B illustrates an exemplary media player 240 that can include a touch screen 226, which can include a display. FIG. 2C illustrates an exemplary wearable device 244 that can include a touch screen 228, which can include a display, and can be attached to a user using a strap 246.

Figure 2D:
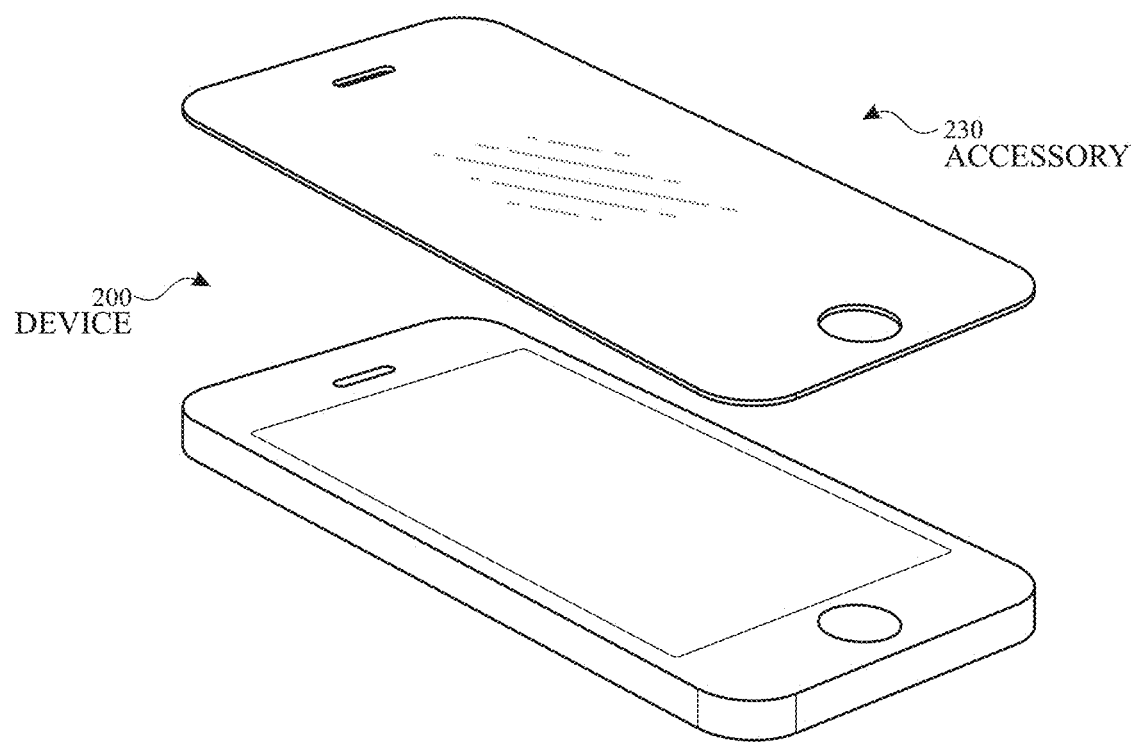
FIG. 2D illustrates an exemplary device, which can be an accessory that attaches to another device having a display, in which examples of the disclosure can be implemented.

FIG. 2D illustrates an exemplary device, which can be an accessory that attaches to another device having a display, in which examples of the disclosure can be implemented. Accessory 230 can be configured to attach to, rest on, and/or touch another device 200. Device 200 can be a mobile telephone 236, media player 240, wearable device 244, and the like, as shown in FIGS. 2A-2C.

Figure 3:
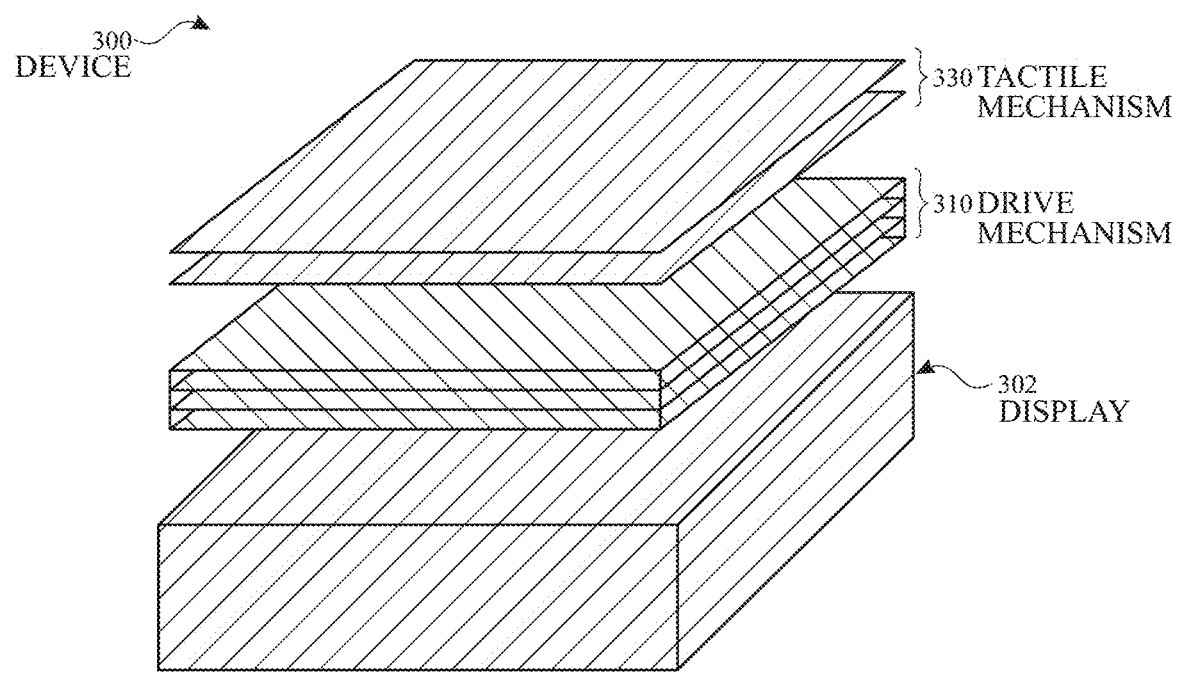
FIG. 3 illustrates a plan view of an exemplary device that generates a haptic interface according to examples of the disclosure.

The device that generates a haptic interface can include a drive mechanism that creates a magnetic profile, and a tactile mechanism that uses the magnetic profile to render a tactile surface (e.g., shapes). In some examples, the magnetic profile can have a two-dimensional variation (i.e., across the surface of the drive mechanism) in the properties (e.g., magnetic strength) of the magnetic fields. FIG. 3 illustrates a plan view of an exemplary device that generates a haptic interface according to examples of the disclosure. For example, a device 300 can include a display 302, a drive mechanism 310, and a tactile mechanism 330. The display 302 can be any type of emissive device such as a liquid crystal display (LCD), organic light emitting diode (OLED) display, light emitting diode (LED) display, electroluminescence (EL) display, and the like. The display 302 can include a plurality of display pixels, where individual display pixels may be controlled and used to collectively display an image.

Additionally, examples of the disclosure can include a device (e.g., an accessory 230 illustrated in FIG. 2D) that does not include a display, but can be configured to attach, rest on, or touch a display 302. The accessory can be separate from the device, where the accessory can include the drive mechanism 310 and tactile mechanism 310 and the device can include the display 302 (not shown). In some examples, the accessory can include the tactile mechanism 330 and the device 300 can include the drive mechanism 310 and display 302 (not shown). In some examples, a plurality of accessories can be configured to attach to, rest on, or touch a display 302. For example, tactile mechanism 330 can be included in one accessory, drive mechanism 310 can be included in another accessory, and display 302 can be included in a device 300, where the two accessories and the device are separate devices (i.e., the accessories can be removed from the device 300 without inhibiting the operability of device 300.) Tactile and/or drive mechanisms separate from the display 302 can provide flexibility in use of the device 300, interchangeability of the tactile and drive mechanisms, or both.

Drive Mechanism

Figure 4A:
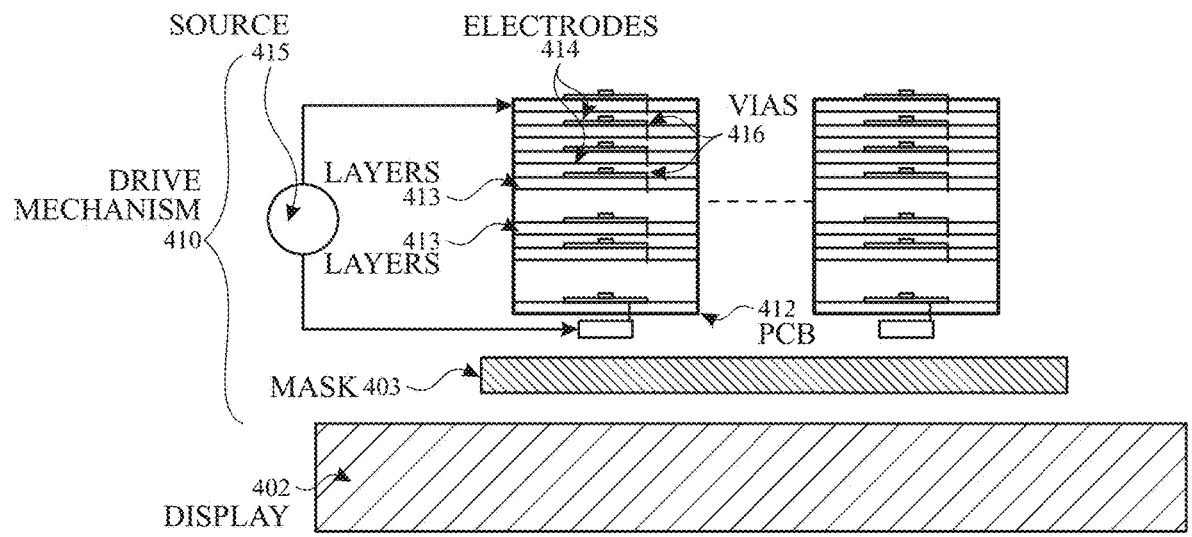
FIG. 4A illustrates a cross-sectional view of an exemplary drive mechanism according to examples of the disclosure.

The drive mechanism included in the device can be configured to generate a two-dimensional magnetic profile. FIG. 4A illustrates a cross-sectional view of an exemplary drive mechanism according to examples of the disclosure. In some examples, the drive mechanism 410 can be a component external from the tactile mechanism and/or display (discussed below). The drive mechanism 410 can include a substrate such as a printed circuit board (PCB) 412, which can be a flexible or rigid PCB. The PCB 412 can include a plurality of layers 413, which can include electrodes 414.

The drive mechanism 410 can include vias 416 to electrically connect the electrodes 414 located on one or more of the plurality layers 413 to form coils. The vias 416 can create one or more electrical connections that begin at the top (i.e., side located furthest away from the display 402) of the drive mechanism 410 and spirals down through multiple layers 413 of the PCB 412 to the bottom (i.e., side located closest to the display 402) of the drive mechanism 410. In some examples, the electrodes 414 can be connected only through the vias 416. The vias 416 can be located on any side(s) of the electrodes 414, such as on one side, two opposite sides, etc. The top of the drive mechanism 410 can include one or more traces (not shown) to connect the electrodes 414 included in the coils to a source 415, used to create the magnetic field(s), as discussed below.

The electrodes 414 can have any shape, size, number of turns, etc. For example, as shown in the top and plan views of FIG. 4B and FIG. 4C, respectively, the electrodes 414 can be ring-shaped. The drive mechanism can further include a plurality of center regions 425 electrically isolated from the plurality of electrodes 414, where each center region 425 can be located between conductive portions of a respective electrode 414.

Figure 4B:
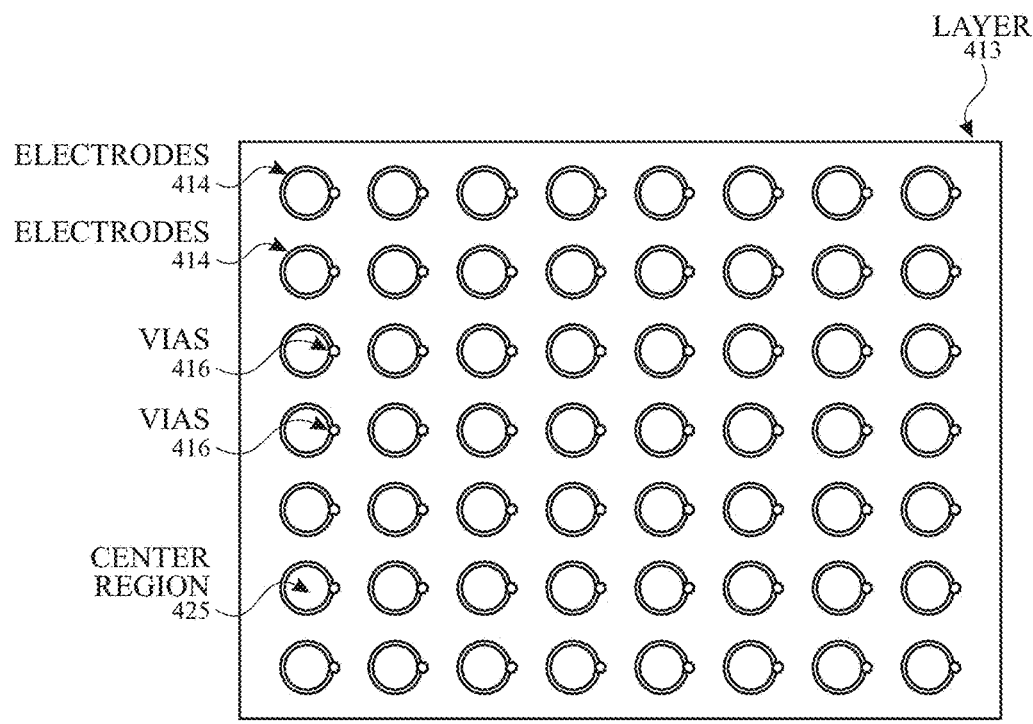
FIGS. 4B-4C illustrate top and plan views of exemplary ring-shaped electrodes included in a drive mechanism according to examples of the disclosure.
Figure 4C:
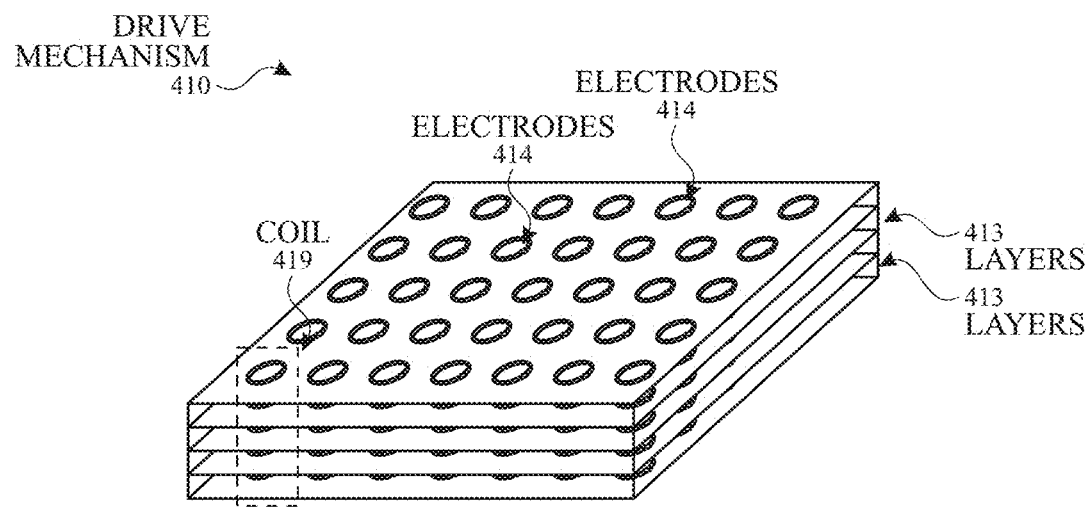

The vias 416 can be located on one side (e.g., the right side of the ring as shown in FIG. 4B) of the electrodes 414 for connecting electrodes together. In some examples, two or more layers 413 can include vias 416 located along different region(s) of the electrodes 414. For example, a via 416 on one layer 413 can be located on the right side of the electrode(s) 414, while a via 416 on another layer 413 can be located on the left side of the electrode(s) 414. Additionally or alternatively, the vias 416 may be located along different region(s) of the electrodes 414 within a given layer 413. For example, on a given layer 413, one or more vias 416 can be located on the left side of the electrode(s) 414, and on the same layer 413, one or more vias 416 can be located on the right side of the electrode(s) 414.

Figure 4D:
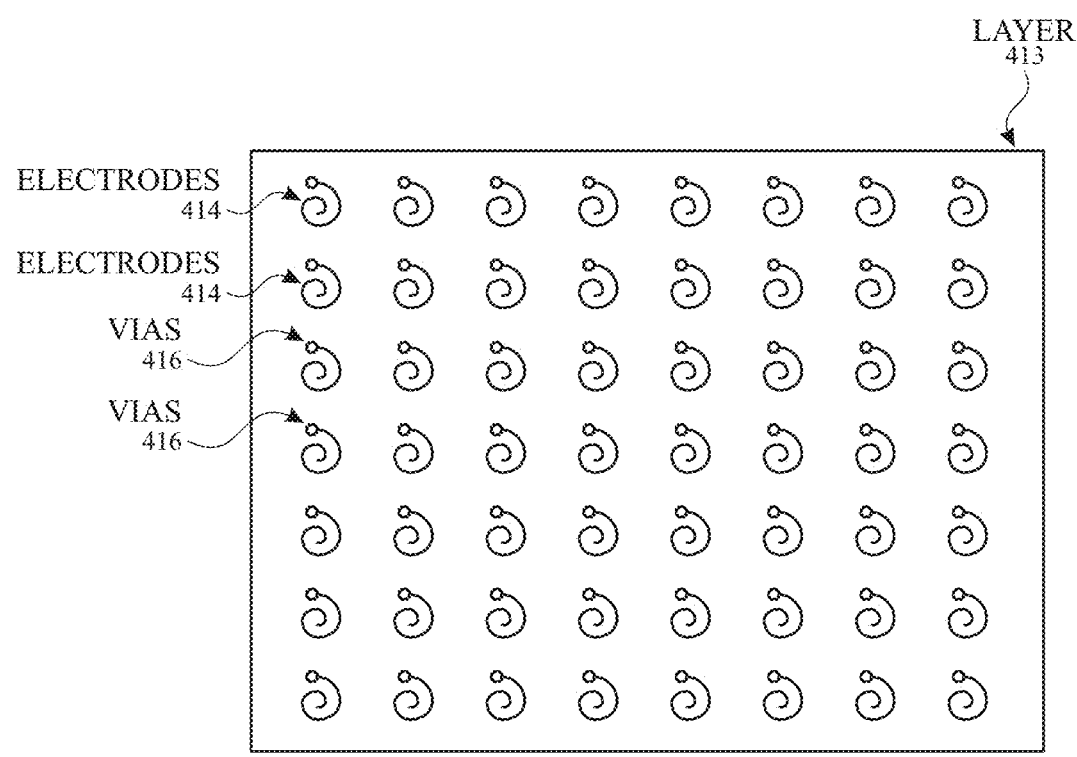
FIG. 4D illustrates a top view of an exemplary spiral electrodes included in a drive mechanism according to examples of the disclosure.

As another example, as shown in FIG. 4D, the electrodes 414 can be spirals that have two or more (e.g., three) turns. One or more vias 416 can be used to connect the spirals on different layers 413. The vias 416 can be located along any location along the spiral, such as at the ends, as shown in the figure. In some examples, a via 416 may be located between the ends of a given spiral (not shown). As applied to any shape, size, or other configuration of the electrodes, examples of the disclosure can include different configurations of the electrodes 414 and vias 416 within a given layer 413 or among multiple layers 413.

Figure 4E:
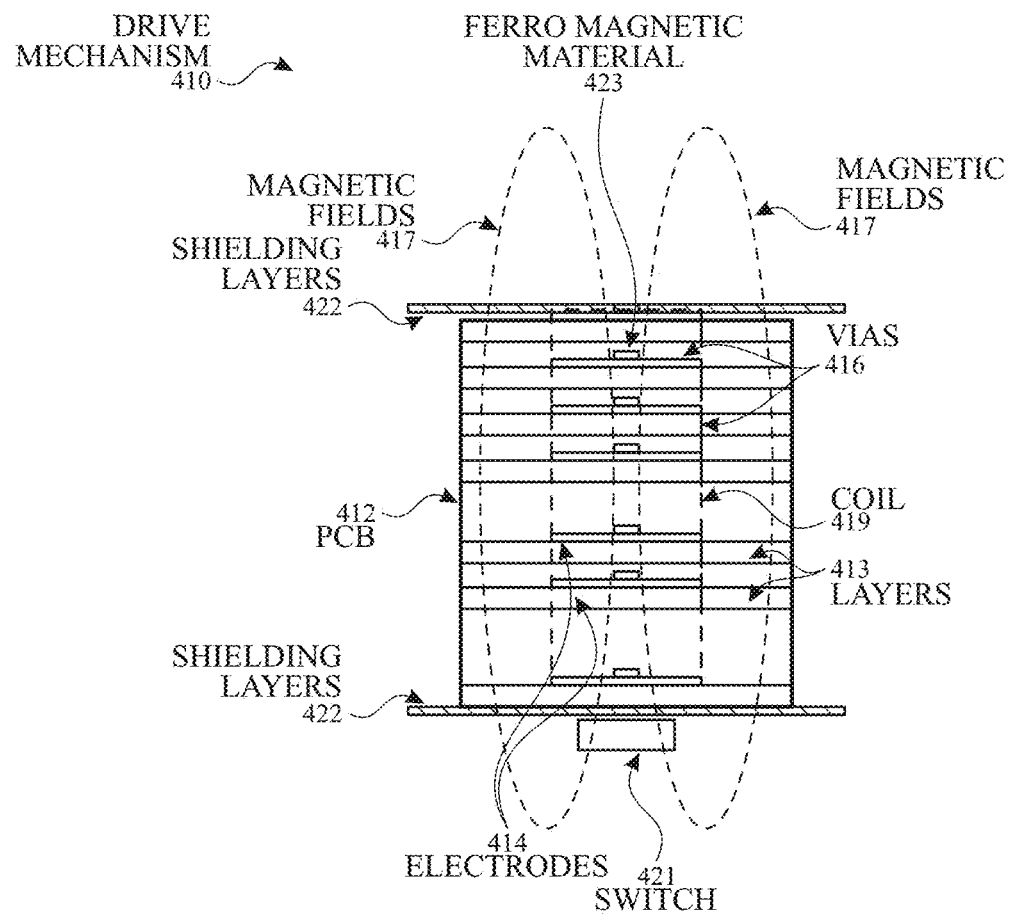
FIG. 4E illustrates a cross-sectional view of a portion of an exemplary drive mechanism and associated magnetic fields according to examples of the disclosure.

As discussed above, the drive mechanism can be configured to create a magnetic profile. FIG. 4E illustrates a cross-sectional view of a portion of an exemplary drive mechanism and associated magnetic fields according to examples of the disclosure. The magnetic fields 417 can be created by applying a bias across the coils 419 to pass current through it. To create a two-dimensional magnetic profile, one option can be to individually address one or more of the coils 419. One or more layers 413 of the drive mechanism 410 can include traces to individually drive the coils 419. Although the figure illustrates one coil 419, examples of the disclosure can include multiple coils 419 and multiple magnetic fields 417. A single coil 419 is shown for simplicity purposes.

Another option can be to include a display (e.g., display 402 illustrated in FIG. 4A) located below the coils 419. The display can be configured to emit light towards the switches 421. The switches 421 can be any type of switch including, but not limited to, a phototransistor. In some examples, each coil 419 can include a unique switch 421. That is, the number of coils 419 and number of switches 421 in the drive mechanism can be 1:1. The image projected by the display can individually control each switch 421. That is, light from the display can be incident on the switch, which thereby can allow current from the source to flow through the coil. In some examples, the number of display pixels to the number of coils 419 can be 1:1. In other examples, a plurality of display pixels can be controlled such that the plurality operates collectively to control a single coil 419. The plurality of display pixels can operate collectively by way of coupling or by having common emission properties (e.g., same color, same intensity, etc.). The shapes of the magnetic fields 417 on the top of some or all of the drive mechanism 410 can mimic (i.e., has properties that resemble) the image displayed by the display. For example, shapes can have a non-zero height from the top surface of the device in locations where the image has a non-zero brightness. In some examples, a mask (e.g., mask 403 illustrated in FIG. 4A) can be located between the display 402 and the switch 421 to prevent or reduce mixing of light from display pixels.

One of ordinary skill in the art would understand that the number of turns, whether on the same layer or among multiple layers, can affect the strength of the magnetic field of a given coil. For example, a linear relationship can exist between the magnetic field and the number of turns (e.g., layers) in a coil. An additional factor that can affect the strength of the magnetic field can be the power applied to the coil via, e.g., source 415 shown in FIG. 4A. Examples of the disclosure are not limited to each coil in the drive mechanism having the same magnetic field strength. Different magnetic field strengths can be created by configuring the coils differently and/or by applying different biases to the coils. The drive mechanism can be configured such that a targeted magnetic field strength can be achieved. In some examples, the targeted magnetic field strength can be based on the material (e.g., a cover material) on top of the device.

In some examples, the drive mechanism 410 can include other components such as ferromagnetic material 423 to enhance field programmability, as discussed in detail below, and/or shielding layer(s) 422 to control the size and/or shape magnetic fields 417, to prevent interference from external sources, or both.

Tactile Mechanism

The device can include a tactile mechanism configured to provide localized tactile or haptic feedback to the user as the user navigates the surface of the device. In some examples, the user may not be viewing or able to view the display (e.g., because the user is occupied with other tasks), so the user can only feel the surface of the device, regardless of the shape, size, and location of virtual buttons and/or other display elements. A display that conveys information visually may make it difficult for users to find icons, hyperlinks, textboxes, or other user-selectable input elements. A device having a surface that renders one or more shapes may be a suitable way to convey information. The device can provide haptic feedback that enables a user to non-visually navigate a visual display.

Touch-based user interface components can also present challenges to visually impaired users, especially when the touch-based user interface component is used in conjunction with a display screen. As used herein, the phrase "visually impaired" refers to users that are permanently visually impaired (e.g., blind) or temporarily visually impaired (e.g., able to see, but unable or unwilling to divert their attention to their electronic device's display screen because there is not enough light to see, they are distracted, etc.). Examples of the disclosure further include users who are engaged in a virtual reality environment, where the device can generate a haptic interface can be used to interact with the user via sensing one or more images (e.g., shapes) on the surface.

The device disclosed throughout can be capable of dynamically changing the size, shape, and location of the one or more shapes rendered. The term "dynamically" refers to the device being to change the properties of the shapes without being powered off. In some examples, the device has the capability of making dynamic changes automatically (i.e., without user input). Additionally, examples of the disclosure can include a full-page refreshable display. The tactile profile across the entire display can be refreshed and is not limited to any particular refresh rate.

Figure 5A:
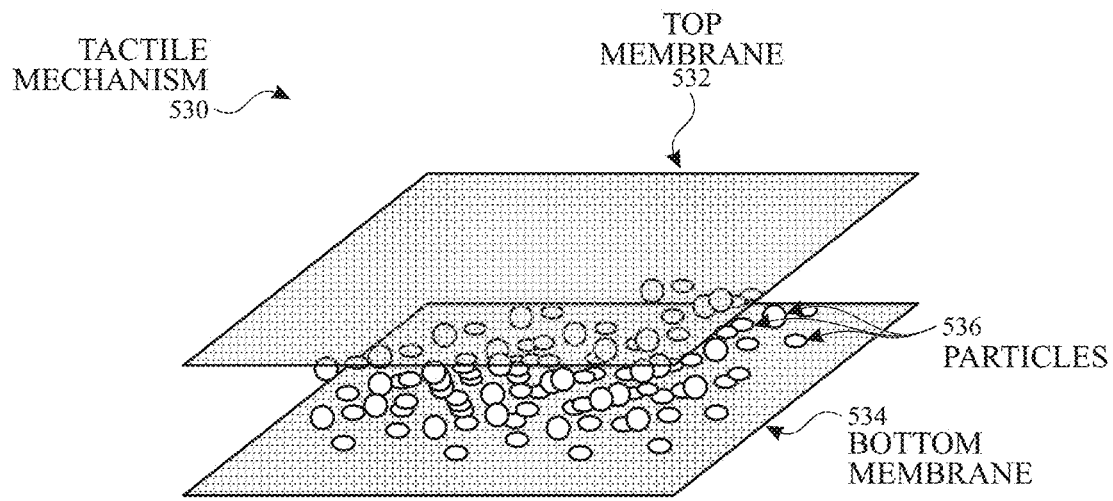
FIG. 5A illustrates a plan view of an exemplary tactile mechanism including particles according to examples of the disclosure.

The tactile mechanism included in the device can be configured to convert the magnetic profile generated by the drive mechanism into a tactile profile. FIG. 5A illustrates a plan view of an exemplary tactile mechanism including particles according to examples of the disclosure. The tactile mechanism 530 can include one or more layers of material, such as a top membrane 532 and a bottom membrane 534. Particles 536 can be located between the top membrane 532 and the bottom membrane 534.

The particles 536 can be ferrous grounds, where a jamming process can be used to render shapes. The particles 536 can interact with one or more magnetic fields and can interlock (e.g., hold together, not move, etc.) when pulled or pressed together. In some examples, the particles 536 can have one or more jagged surfaces to facilitate the interlocking. One or more properties of the particles can be based on the targeted type of image(s) and/or granularity of the device. These properties can include, but are not limited to, particle size, ratio of various different sized particles (e.g., larger particles to smaller particles), and density of the particles.

The top membrane 532 and the bottom membrane 534 can be any type of membrane that is thin, strong, ungrippable, and/or has a low friction. In some examples, the magnitude of the friction of the bottom membrane 534 can be lower than the magnitude of the friction of the top membrane 532. The tactile mechanism 530 may not include the top membrane 532 in some instances, such as when the particles are magnetic and can hold themselves together.

Figure 5B:
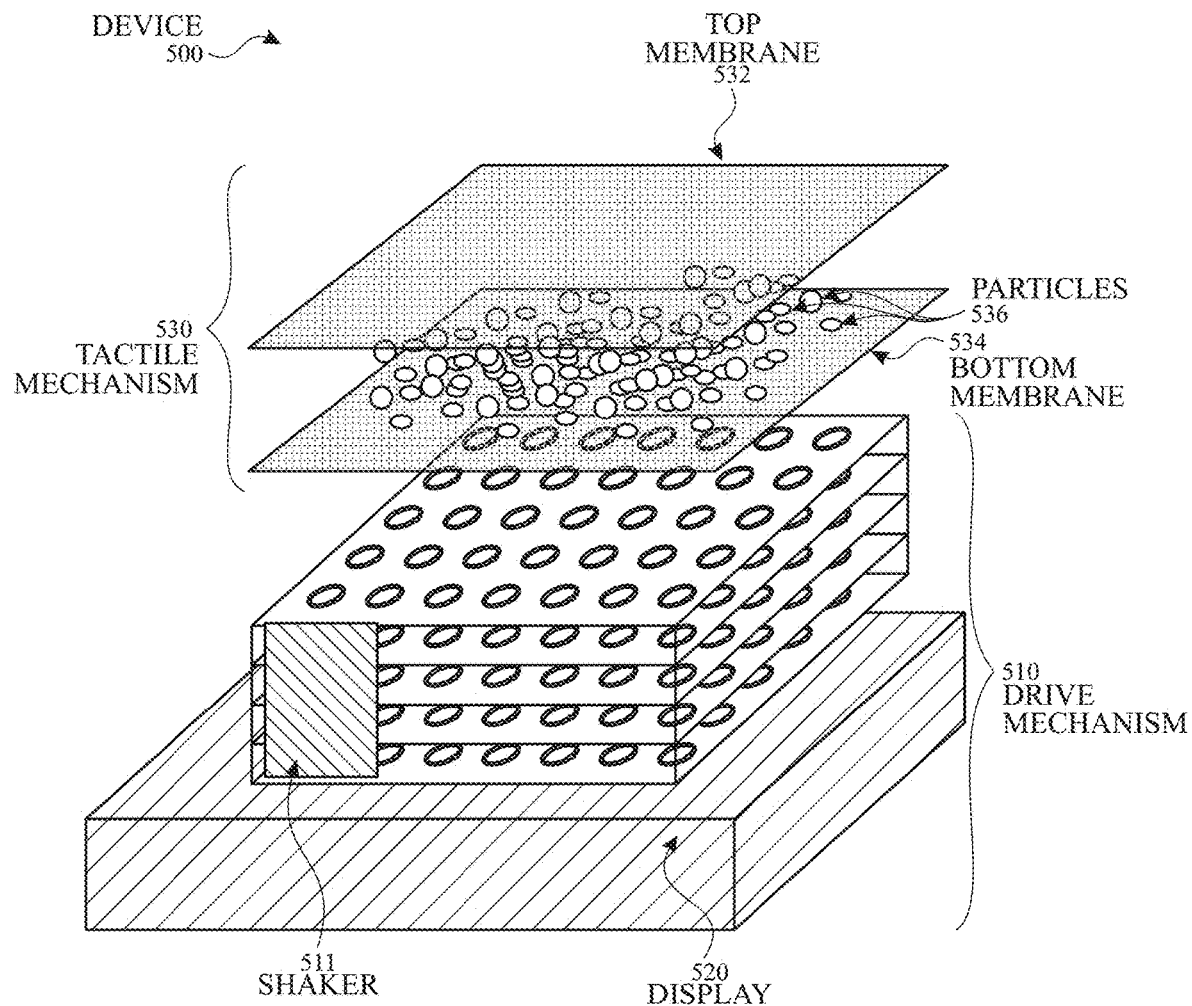
FIG. 5B illustrates a plan view of an exemplary device including a tactile mechanism that uses particles according to examples of the disclosure.

FIG. 5B illustrates a plan view of an exemplary device including a tactile mechanism that uses particles according to examples of the disclosure. The device 500 can include a drive mechanism 510 and the tactile mechanism 530. The drive mechanism 510 can include one or more components and/or functionalities similar to the drive mechanism 410 illustrated in FIGS. 4A-4E and can additionally include a shaker 511.

The shaker 511 can configured to physically shake the device 500. The device 500 may be capable of using power (e.g., to power the shaker 511) to form or change the shape(s), but not to hold the shape(s). Exemplary shakers include, but are not limited to, a piezoelectric element, eccentric motor, and the like. In some examples, the shape(s) of the haptic interface can be held indefinitely until the shaker 511 shakes the device 500 and/or the magnetic profile from the drive mechanism 510 changes. When the shaker 511 shakes the device 500, the particles may separate (i.e., leave the interlocked state).

Examples of the disclosure can include multiple shakers 511 included in the device 500. The shakers 511 can be located at predetermined distances to induce one or more Lamb waves across the drive mechanism 510. For example, at least one shaker 511 can be located along one side (e.g., bottom side) of the drive mechanism, and at least another shaker 511 can be located along another side (e.g., perpendicular to the bottom side, such as the right side) of the device 500. In other examples, the device 500 can include one shaker 511 and a piezo layer (not shown) coupled to the shaker 511 to induce uniform movement of the particles.

Figure 5C:
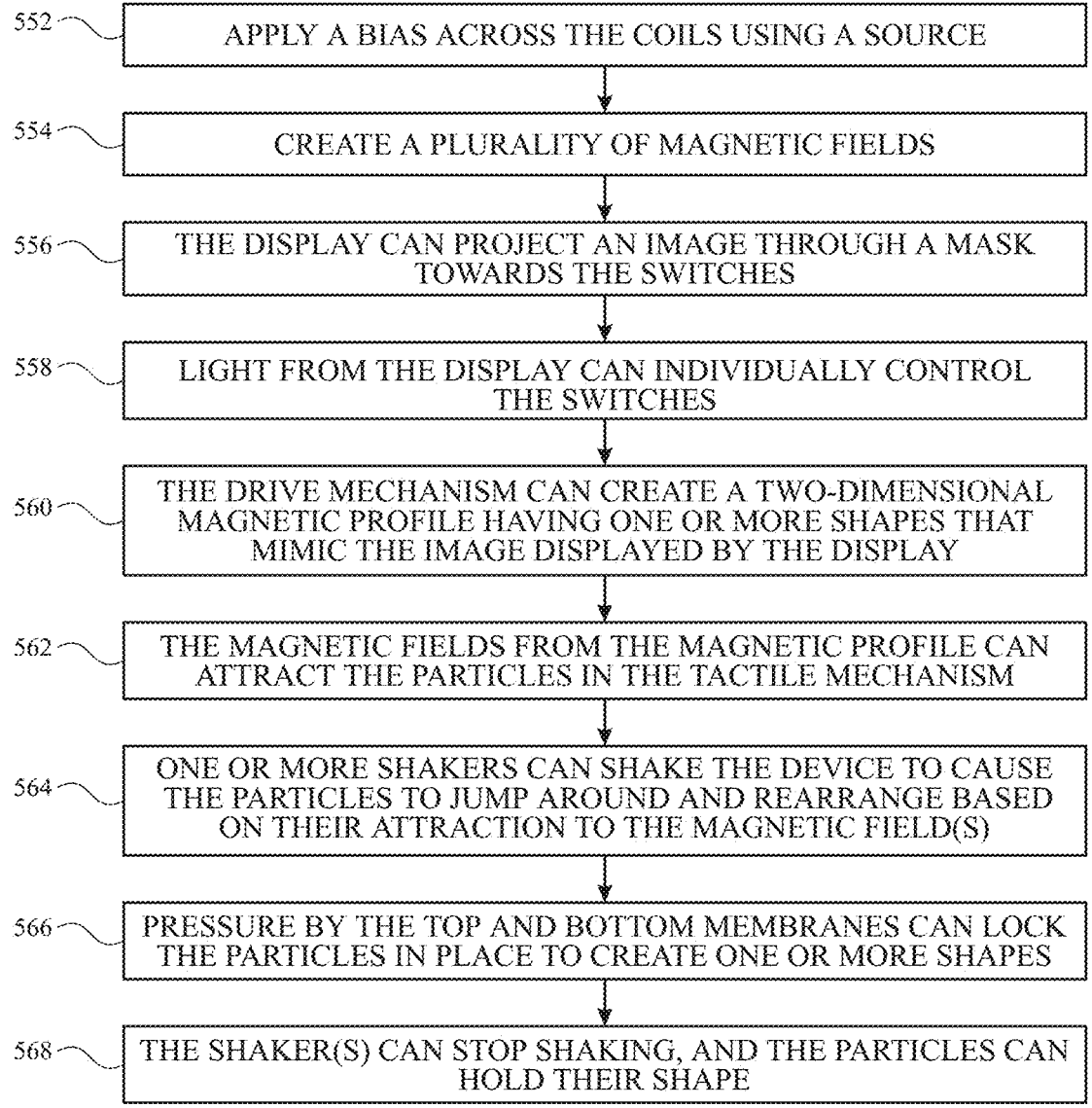
FIG. 5C illustrates an exemplary process for operating a device that generates a haptic interface including a tactile mechanism that uses particles according to examples of the disclosure.

FIG. 5C illustrates an exemplary process for operating a device that generates a haptic interface including a tactile mechanism that uses particles according to examples of the disclosure. Process 550 can include applying a bias across the coils (e.g., coils 419 illustrated FIG. 4C) using a source (e.g., source 415 illustrated in FIG. 4A) (step 552). The current that passes through the coils can create a plurality of magnetic fields (e.g., magnetic fields 417 illustrated in FIG. 4E) (step 554). A display can project an image through a mask (e.g., mask 403 illustrated in FIG. 4A) and towards one or more switches (e.g., switch 421 illustrated in FIG. 4E) (step 556). Light from the display (e.g., display 402 illustrated in FIG. 4A) can individually control the switches (step 558). The drive mechanism can create a two-dimensional magnetic profile having one or more shapes that mimic the image displayed by the display (step 560). The magnetic profile can be located between the tactile and drive mechanisms.

The magnetic fields from the magnetic profile can attract particles (e.g., particles 536 in FIG. 5A) in the tactile mechanism (step 562). To change the state (e.g., including rendered shapes) of the haptic interface, one or more shakers (e.g., shaker 511 illustrated in FIG. 5B) can shake the device causing the particles to jump around (i.e., move) and rearrange based on their attraction to the magnetic field(s) (step 564). The pressure from the top and bottom membranes (e.g., top and bottom membranes 532 and 534, respectively, illustrated in FIG. 5B) can lock the particles in place to create one or more shapes (step 566). The particles can lock into place (i.e., not move), and the shaker(s) can stop shaking, so the particles can hold their shape (step 568).

In some examples, the magnetic field from the drive mechanism can be a static magnetic field. One or more parameters of a component within the device can facilitate movement of the particles. For example, the display can increase or decrease the speed of the movement of the particles by way of changes (e.g., corresponding frequency) in the image displayed. As another example, the shaker can increase or decrease the frequency of refreshing the haptic interface by way of frequency of the shaking. In some examples, the user can help the particles interlock using the force of his or her fingers. The user's fingers can help provide an interface with a higher lateral force capacity since lateral force capacity can be based on the particles jamming.

Figure 6A:
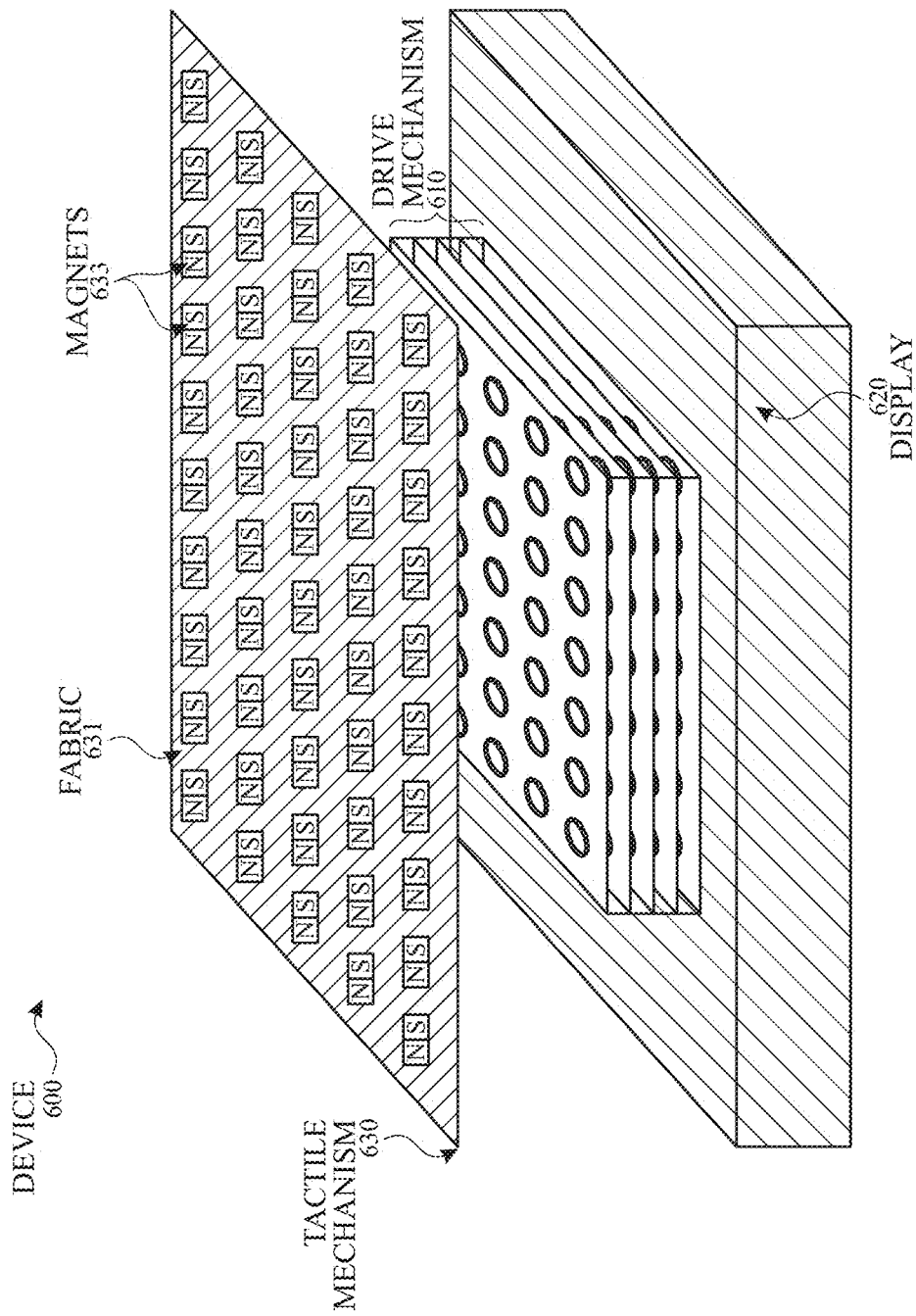
FIG. 6A illustrates a device including an exemplary tactile mechanism having a fabric according to examples of the disclosure.

In some examples, the tactile mechanism can include a fabric. FIG. 6A illustrates a device including an exemplary tactile mechanism having a fabric according to examples of the disclosure. The device 600 can include a drive mechanism 610, a display 620, and a tactile mechanism 630. The drive mechanism 610 can include one or more components and/or functionalities as described above. The display 620 can include one or more components and/or functionalities as described above.

The tactile mechanism 630 can include a layer of material, such as fabric 631, which can include embedded magnets 633. The fabric 631 can include any type of material that is flexible between the magnets 633. In some instances, the tactile mechanism 630 can include a polymer, instead of or in addition to a fabric-like material. The fabric 631 can buckle and form shapes based on the magnetic profile generated by the drive mechanism 610. Lateral movement of the magnets 633 can pinch the fabric, which can cause it to pop up due to buckling. In some examples, the fabric 631 can include programmable holes.

Figure 6B:
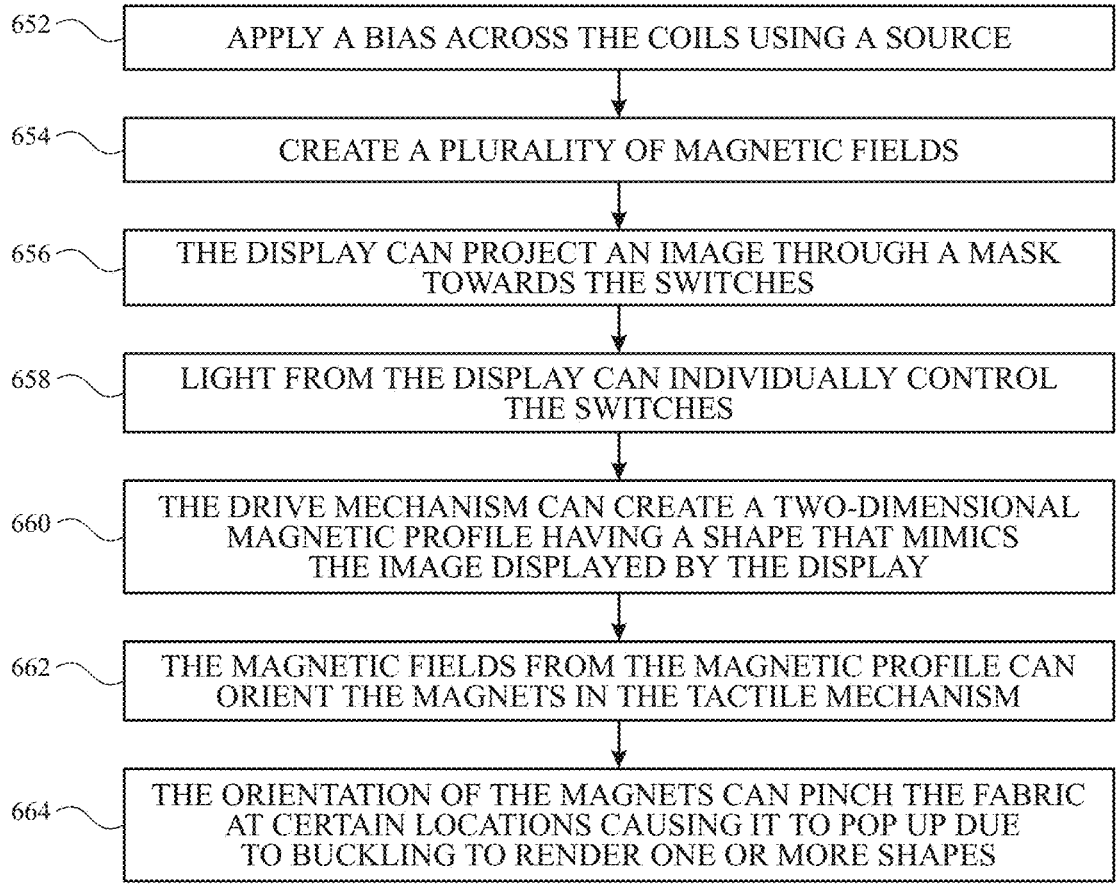
FIG. 6B illustrates an exemplary process for operating a device that generates a haptic interface including a tactile mechanism that uses a fabric having magnets according to examples of the disclosure.

FIG. 6B illustrates an exemplary process for operating a device that generates a haptic interface including a tactile mechanism that uses a fabric having magnets according to examples of the disclosure. Process 650 can include applying a bias across the coils (e.g., coils 419 illustrated in FIG. 4E) using a source (e.g., source 415 illustrated in FIG. 4A) (step 652). The current that passes through the coils can create a plurality of magnetic fields (e.g., magnetic fields 417 illustrated in FIG. 4E) (step 654). A display included in the device can project an image through a mask (e.g., mask 403 illustrated in FIG. 4A) and towards the switches (e.g., switch 421 illustrated in FIG. 4E) (step 656). Light from the display (e.g., display 402 illustrated in FIG. 4A) can individually control the switches (step 658). The drive mechanism can create a two-dimensional magnetic profile having a shape that mimics the image displayed by the display (step 660). The magnetic profile can be located between the tactile and drive mechanisms.

The magnetic fields from the magnetic profile can orient the magnets (e.g., magnets 633 illustrated in FIG. 6A) in the fabric (e.g., fabric 631 illustrated in FIG. 6A) (step 662). The orientation of the magnets can pinch the fabric at certain location(s), which can cause the fabric to pop up due to buckling (step 664). The popped up fabric can render one or more shapes on the haptic interface.

In some examples, the drive mechanism 630 can cause one or more magnets 633 to rotate. The magnets 633 can be used to render shapes and/or movement on the surface of the haptic interface. For example, the magnets can be used to create the sensation of damping to the user. The user may be able to apply a force to the surface of the device, such as pushing a wave back and forth along the surface of the device. Additionally or alternatively, the device may simulate having an object hit the user's body part or the like. As another example, the haptic interface can be used to create a feeling of moving through a certain type of material (e.g., tar, water, etc.), where the level of viscosity felt in the fabric can be adjustable. Examples of the disclosure can include creating different levels of viscosity across the surface of the haptic interface at the same time.

In some instances, the device can be capable of sensing the location of where the user is touching the device. The device can include sense circuitry, where the movement of one or more magnets 633 can be detected based on a detected change in current at a given location along the device.

Figure 7A:
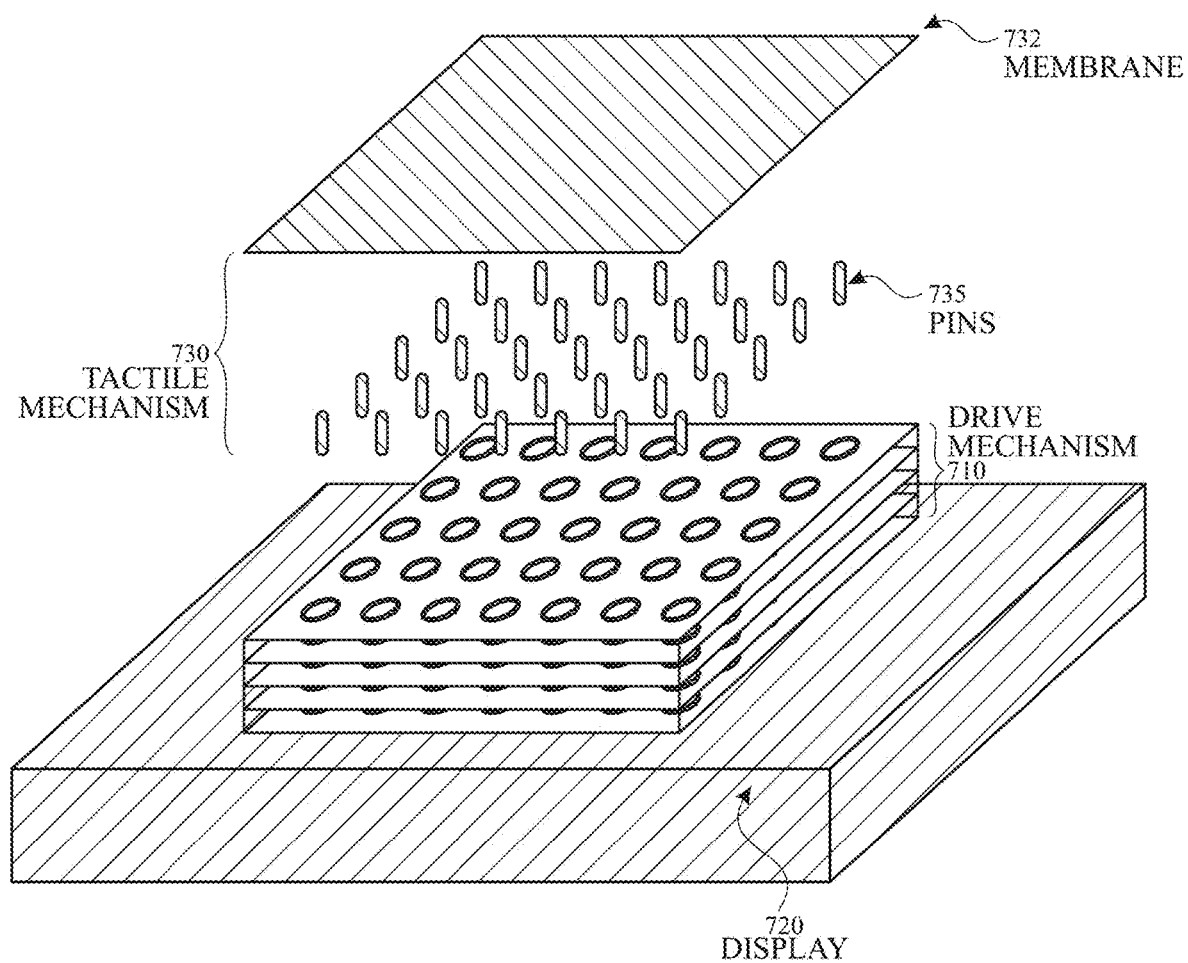
FIG. 7A illustrates a device including an exemplary tactile mechanism having a plurality of pins according to examples of the disclosure.

In some examples, the tactile mechanism can include components that can displace within the layer(s) of the drive mechanism. FIG. 7A illustrates a device including an exemplary tactile mechanism having a plurality of pins according to examples of the disclosure. The device 700 can include a drive mechanism 710, a display 720, and a tactile mechanism 730. The drive mechanism 710 can include one or more components and/or functionalities as described above. The display 720 can include one or more components and/or functionalities as described above.

The tactile mechanism 730 can include a layer of material, such as membrane 732. The pins 735 can be vertically-oriented (i.e., the length of the pins 735 along the direction perpendicular to the plane of the drive mechanism 710 can be greater than the width of the pins) and located, at least partially, between the membrane 732 and the drive mechanism 710. The pins 735 can interact with one or more magnetic fields generated by the drive mechanism 710, which can cause the pins 735 to move up or down (i.e., toward or away from the membrane 732). The pins 735 may move in or out of the center regions (e.g., center regions 425 illustrated in FIG. 4B) such that the shape(s) can be rendered based on the location of the top ends of the pins 735.

The pins 735 can be ferrous pins that can change the magnetism of the core of the coils. In some instances, in the drive mechanism, a current can be passed through the core of the coils to change the magnetism of the coils. The current may, in some examples, include transient current pulses or can be a constant current. The membrane 732 can be any type of membrane that is thin, strong, ungrippable, and/or has a low friction. In some examples, each coil (e.g., coil 419 illustrated in FIG. 4E) can include one pin 735 located in its core.

Figure 7B:
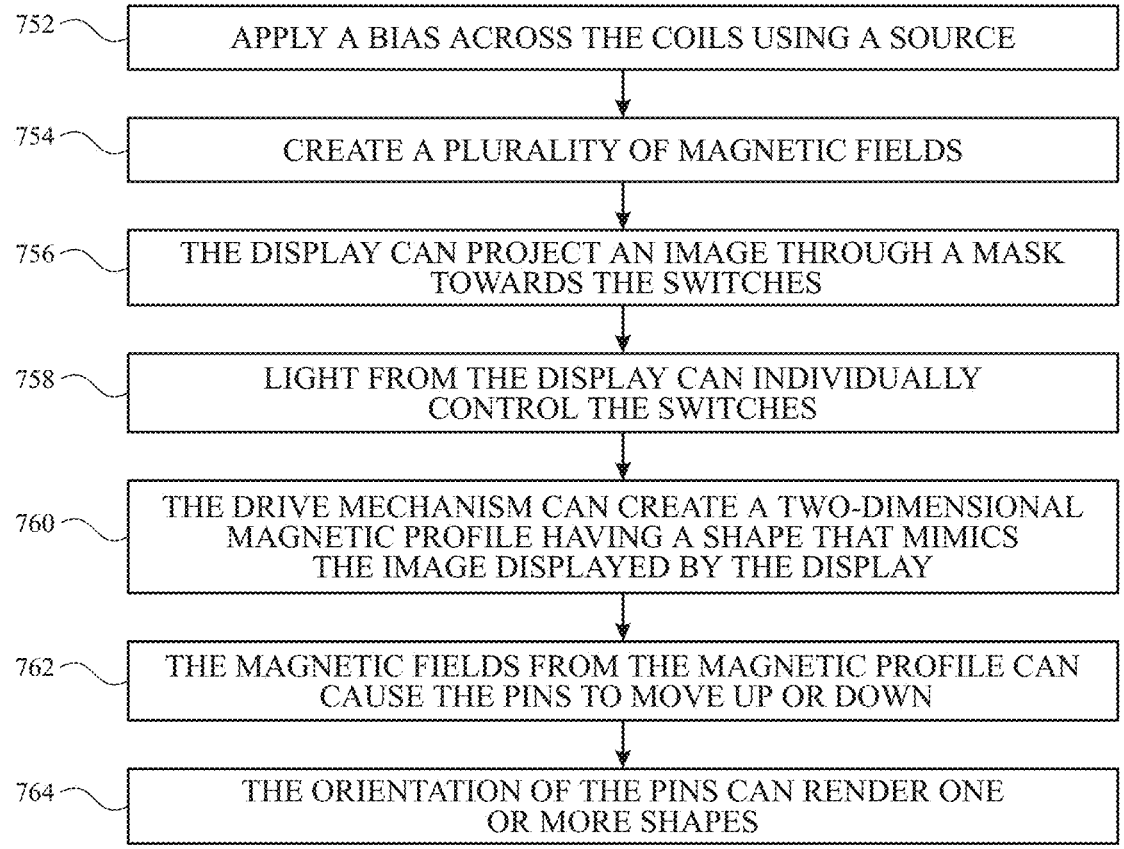
FIG. 7B illustrates an exemplary process for operating a device that generates a haptic interface including a tactile mechanism that uses pins according to examples of the disclosure.

FIG. 7B illustrates an exemplary process for operating a device that generates a haptic interface including a tactile mechanism that uses pins according to examples of the disclosure. Process 750 can include applying a bias across the coils (e.g., coils 419 illustrated in FIG. 4E) using a source (e.g., source 415 illustrated in FIG. 4A) (step 752). The current that passes through the coils can create a plurality of magnetic fields (e.g., magnetic fields 417 illustrated in FIG. 4E) (step 754). A display can project an image through a mask (e.g., mask 403 illustrated in FIG. 4A) and towards the switches (e.g., switch 421 illustrated in FIG. 4E) (step 756). Light from the display (e.g., display 402 illustrated in FIG. 4A) can individually control the switches (step 758). The drive mechanism can create a two-dimensional magnetic profile having a shape that mimics the image displayed by the display (step 760).

The magnetic fields from the magnetic profile can cause the pins to move up or down (step 762). The orientation of the pins can then render one or more shapes on the haptic interface (step 764).

Examples of the disclosure can include a tactile mechanism including two or more of the components and/or functionalities described with above. The examples disclosed above can be interoperable. For example, a tactile mechanism can include particles located in one or more areas of the device and pins located in other areas. In some examples, the locations having particles can be interleaved with the locations having pins.

Figure 8:
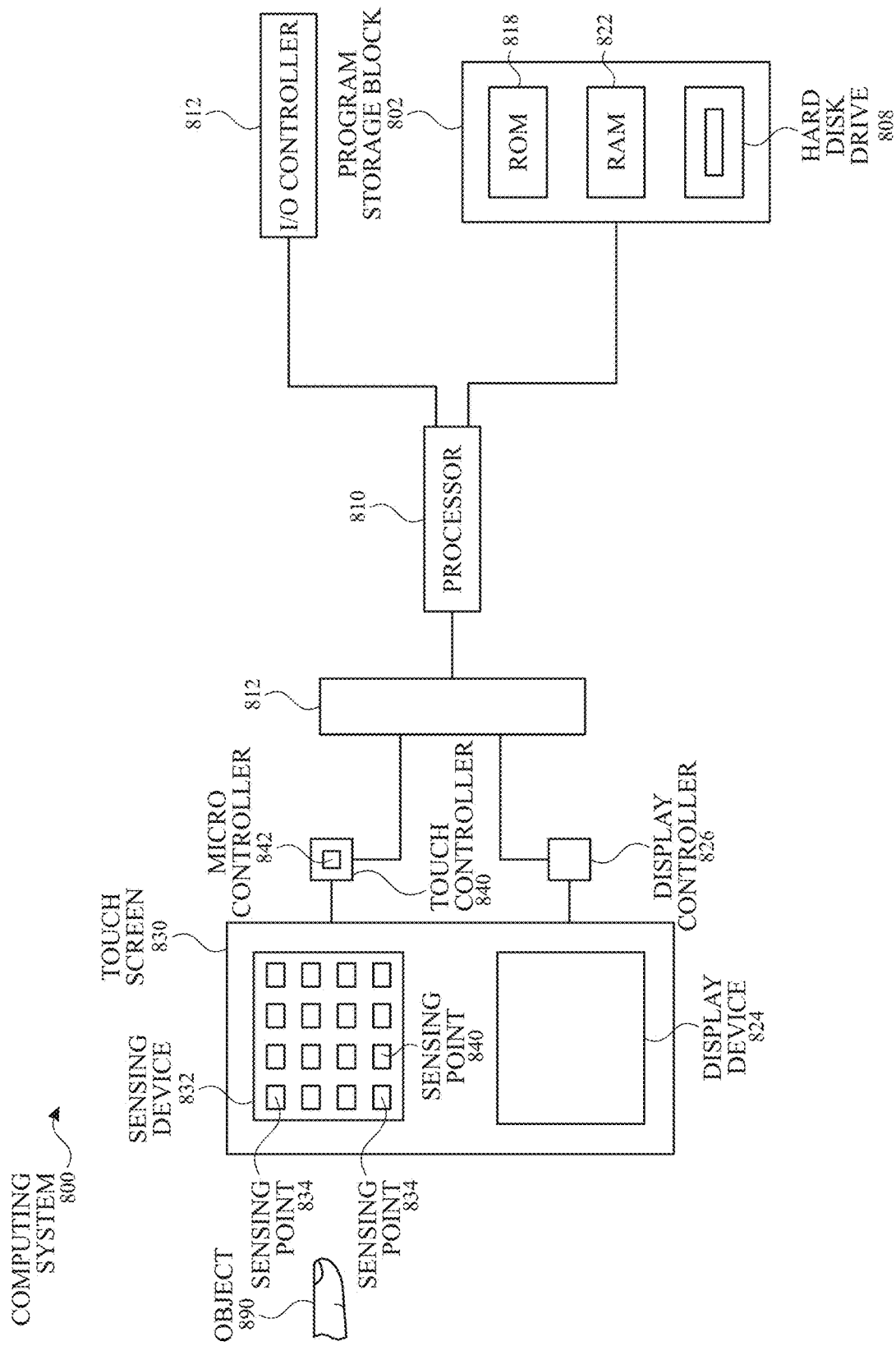
FIG. 8 illustrates an exemplary block diagram of a computing system comprising a device that generates a haptic interface according to examples of the disclosure.

FIG. 8 illustrates an exemplary block diagram of a computing system comprising a device that generates a haptic interface according to examples of the disclosure. Computing system 800 can correspond to any of the computing devices illustrated in FIGS. 2A-2C. Computing system 800 can include a processor 810 configured to execute instructions and to carry out operations associated with computing system 800. For example, using instructions retrieved from memory, processor 810 can control the reception and manipulation of input and output data between components of computing system 800. Processor 810 can be a single-chip processor or can be implemented with multiple components.

In some examples, processor 810 together with an operating system can operate to execute computer code and produce and use data. The computer code and data can reside within a program storage block 802 that can be operatively coupled to processor 810. Program storage block 802 can generally provide a place to hold data that is being used by computing system 800. Program storage block 802 can be any non-transitory computer-readable storage medium, and can store, for example, programs to execute the processes described throughout this disclosure. By way of example, program storage block 802 can include Read-Only Memory (ROM) 818, Random-Access Memory (RAM) 822, hard disk drive 808 and/or the like. The computer code and data could also reside on a removable storage medium and loaded or installed onto the computing system 800 when needed. Removable storage mediums include, for example, CD-ROM, DVD-ROM, Universal Serial Bus (USB), Secure Digital (SD), Compact Flash (CF), Memory Stick, Multi-Media Card (MMC) and a network component.

Computing system 800 can also include an input/output (I/O) controller 812 that can be operatively coupled to processor 810, or it can be a separate component as shown. I/O controller 812 can be configured to control interactions with one or more I/O devices. I/O controller 812 can operate by exchanging data between processor 810 and the I/O devices that desire to communicate with processor 810. The I/O devices and I/O controller 812 can communicate through a data link. The data link can be a one-way link or a two-way link. In some cases, I/O devices can be connected to I/O controller 812 through wireless connections. By way of example, a data link can correspond to PS/2, USB, Firewire, IR, RF, Bluetooth or the like.

Computing system 800 can include a display device 824 that can be operatively coupled to processor 810. Display device 824 can be a separate component (peripheral device) or can be integrated with processor 810 and program storage block 802 to form a desktop computer (e.g., all-in-one machine), a laptop, handheld or tablet computing device of the like. Display device 824 can be configured to display a graphical user interface (GUI) including perhaps a pointer or cursor as well as other information to the user. By way of example, display device 824 can be any type of display (e.g., visible display) including a liquid crystal display (LCD), an electroluminescent display (ELD), a field emission display (FED), a light emitting diode display (LED), an organic light emitting diode display (OLED) or the like.

Display device 824 can be coupled to display controller 826 that can be coupled to processor 810. Processor 810 can send raw data to display controller 826, and the display controller 826 can send signals to display device 824. Data can include voltage levels for a plurality of pixels in display device 824 to project an image. In some examples, processor 810 can be configured to process the raw data.

Computing system 800 can also include a touch screen 830 that can be operatively coupled to processor 810. Touch screen 830 can be a combination of sensing device 832 and display device 824, where the sensing device 832 can be a transparent panel that is positioned in front of display device 824 or integrated with display device 824. In some cases, touch screen 830 can recognize touches and the position and magnitude of touches on its surface. Touch screen 830 can report the touches to processor 810, and processor 810 can interpret the touches in accordance with its programming. For example, processor 810 can perform tap and event gesture parsing and can initiate a wake of the device or powering on one or more components in accordance with a particular touch.

Touch screen 830 can be coupled to a touch controller 840 that can acquire data from touch screen 830 and can supply the acquired data to processor 810. In some cases, touch controller 840 can be configured to send raw data to processor 810, and processor 810 can process the raw data. For example, processor 810 can receive data from touch controller 840 and can determine how to interpret the data. The data can include the coordinates of a touch as well as pressure exerted. In some examples, touch controller 840 can be configured to process raw data itself. That is, touch controller 840 can read signals from sensing points 834 located on sensing device 832 and can turn the signals into data that the processor 810 can understand.

Touch controller 840 can include one or more microcontrollers such as microcontroller 842, each of which can monitor one or more sensing points 834. Microcontroller 842 can, for example, correspond to an application specific integrated circuit (ASIC), which works with firmware to monitor the signals from sensing device 832, process the monitored signals, and report this information to processor 810.

One or both display controller 826 and touch controller 840 can perform filtering and/or conversion processes. Filtering processes can be implemented to reduce a busy data stream to prevent processor 810 from being overloaded with redundant or non-essential data. The conversion processes can be implemented to adjust the raw data before sending or reporting them to processor 810.

A drive mechanism for a haptic interface is disclosed. The drive mechanism can comprise: a substrate including a plurality of layers, at least some of the plurality of layers including a plurality of electrodes and a plurality of vias, the plurality of vias configured to electrically connect two or more of the plurality of electrodes located on different layers to form one or more coils, wherein the one or more coils are configured to generate one or more magnetic fields when a current passes through a respective coil; a source configured to generate the current; and a plurality of switches configured to allow the current from the source to pass through the one or more coils. Additionally or alternatively, in some examples, the substrate further comprises a plurality of center regions electrically isolated from the plurality of electrodes, each center region located between conductive portions of a respective electrode. Additionally or alternatively, in some examples, the drive mechanism further comprises ferrous material located in the plurality of center regions. Additionally or alternatively, in some examples, the plurality of electrodes is ring-shaped. Additionally or alternatively, in some examples, the drive mechanism is capable of generating a magnetic profile, the magnetic profile based on the plurality of switches. Additionally or alternatively, in some examples, the drive mechanism is included in an accessory, the accessory capable of being attached to, resting on, or touching a device separate and distinct from the accessory. Additionally or alternatively, in some examples, the drive mechanism is included in a device, the device comprises a display, wherein the display is configured to emit light towards the plurality of switches, and the emitted light activates at least some of the plurality of switches to allow the current from the source to pass through the one or more coils. Additionally or alternatively, in some examples, the device is included in a virtual reality system.

A tactile mechanism is disclosed. The tactile mechanism can include: one or more layers of material; and one or more magnetic components, the one or more magnetic components configured to move based on one or more magnetic fields generated by a component external from the tactile mechanism, wherein the one or more magnetic components are located proximate to at least one of the one or more layers of material, wherein the tactile mechanism is included in an accessory or a device, the accessory or the device including the drive mechanism, wherein the tactile mechanism is configured to render a haptic interface that mimics a magnetic profile from the one or more magnetic fields. Additionally or alternatively, in some examples, the one or more magnetic components includes a plurality of magnetic particles located between two of the one or more layers of material, the tactile mechanism further comprising: one or more shakers configured to shake the tactile mechanism to cause the plurality of magnetic particles to move, wherein the plurality of magnetic particles are configured to interlock when not moving. Additionally or alternatively, in some examples, the one or more shakers are located along at least one side of the drive mechanism and along another side of the drive mechanism. Additionally or alternatively, in some examples, the one or more magnetic components includes a plurality of magnets embedded in the one or more layers of material, the one or more layers of material configured to buckle in response to the one or more magnetic fields. Additionally or alternatively, in some examples, the one or more magnetic components include a plurality of pins configured to move up or down in response to the one or more magnetic fields.

A method for rendering one or more shapes on a tactile display is disclosed. The method can comprise: creating a magnetic profile based on a plurality of magnetic fields by: applying a bias across a plurality of coils included in the tactile display, and allowing current to pass through the plurality of coils using a plurality of switches; emitting light towards the plurality of switches using a visible display; activating the plurality of switches using the emitted light; moving one or more magnetic components using the plurality of magnetic fields; and rendering the one or more shapes based on a state of the one or more magnetic components. Additionally or alternatively, in some examples, the method further comprises: shaking the tactile display using one or more shakers, wherein the shaking causes the one or more magnetic components to separate from an interlocked state. Additionally or alternatively, in some examples, the method further comprises: terminating the shaking of the tactile display; and locking the particles in place using at least one of a plurality of membranes. Additionally or alternatively, in some examples, moving the one or more magnetic components includes causing one or more layers of material to buckle due to the movement of a plurality of magnets included in the one or more layers of material. Additionally or alternatively, in some examples, moving the one or more magnetic components includes moving a plurality of pins in and out of center regions, the center regions located between conductive electrodes of the plurality of coils, wherein the one or more shapes are based on locations of top ends of the plurality of pins. Additionally or alternatively, in some examples, the current allowed to pass through the plurality of coils includes transient current pulses. Additionally or alternatively, in some examples, the method further comprises creating a feeling or movement at a surface of the tactile display by adjusting a control of one or more of shape, stiffness, viscosity, and inertial forces in a lateral direction and a normal direction relative to the surface of the tactile display. Additionally or alternatively, in some examples, the created feeling or movement is in response to a force by a user.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A drive mechanism for a haptic interface, the drive mechanism comprising:
    a substrate including a plurality of layers, at least some of the plurality of layers including a plurality of electrodes and a plurality of vias, the plurality of vias configured to electrically connect two or more of the plurality of electrodes located on different layers to form one or more coils, wherein the one or more coils are configured to generate one or more magnetic fields when a current passes through a respective coil;
    a source configured to generate the current; and
    a plurality of switches configured to allow the current from the source to pass through the one or more coils, wherein the drive mechanism is couplable to an electronic device having a display configured to emit visible light towards the plurality of switches to activate at least some of the plurality of switches to allow the current from the source to pass through the one or more coils.

2. The drive mechanism of claim 1, wherein the substrate further comprises a plurality of center regions electrically isolated from the plurality of electrodes, each center region located between conductive portions of a respective electrode.

3. The drive mechanism of claim 2, further comprising ferrous material located in the plurality of center regions.

4. The drive mechanism of claim 1, wherein the plurality of electrodes is ring-shaped.

5. The drive mechanism of claim 1, wherein the drive mechanism is capable of generating a magnetic profile, the magnetic profile based on the plurality of switches.

6. The drive mechanism of claim 1, wherein the drive mechanism is included in an accessory, the accessory configured to be attached to, resting on, or touching the electronic device, and the electronic device is separate and distinct from the accessory.

7. The drive mechanism of claim 1, wherein the drive mechanism is integrated in the electronic device.

8. The drive mechanism of claim 7, wherein the electronic device is included in a virtual reality system.

9. A tactile mechanism including:
    one or more layers of material; and
    one or more magnetic components, the one or more magnetic components configured to move based on one or more magnetic fields generated by a drive mechanism external from the tactile mechanism,
    wherein the one or more magnetic components are located proximate to at least one of the one or more layers of material such that the magnetic fields generated by the drive mechanism cause at least one of the one or more magnetic components to make contact with the at least one of the one or more layers, and in the absence of the magnetic fields, the at least one of the one or more magnetic components breaks contact with the at least one of the one or more layers,
    wherein the tactile mechanism is included in an accessory or a device, the accessory or the device including the drive mechanism,
    wherein the tactile mechanism is configured to render a haptic interface that mimics a magnetic profile from the one or more magnetic fields.

10. The tactile mechanism of claim 9, wherein the one or more magnetic components includes a plurality of magnetic particles located between two of the one or more layers of material, the tactile mechanism further comprising:
    one or more shakers configured to shake the tactile mechanism to cause the plurality of magnetic particles to move,
    wherein the plurality of magnetic particles is configured to interlock when not moving.

11. The tactile mechanism of claim 10, wherein the one or more shakers are located along at least one side of the drive mechanism and along another side of the drive mechanism.

12. The tactile mechanism of claim 9, wherein the one or more magnetic components include a plurality of pins configured to move up or down in response to the one or more magnetic fields.

13. A method for rendering one or more shapes on a tactile display, the method comprising:
    creating a magnetic profile based on a plurality of magnetic fields by:
        applying a bias across a plurality of coils included in the tactile display, and
        allowing current to pass through the plurality of coils using a plurality of switches;
    emitting visible light towards the plurality of switches using a visible display;

activating the plurality of switches using the emitted visible light;

moving one or more magnetic components using the plurality of magnetic fields; and rendering the one or more shapes based on a state of the one or more magnetic components.

14. The method of claim 13, further comprising:

shaking the tactile display using one or more shakers, wherein the shaking causes the one or more magnetic components to separate from an interlocked state.

15. The method of claim 14, further comprising:

terminating the shaking of the tactile display; and locking the one or more magnetic components in place using at least one of a plurality of membranes.

16. The method of claim 13, wherein moving the one or more magnetic components includes causing one or more layers of material to buckle due to movement of a plurality of magnets included in the one or more layers of material.

17. The method of claim 13, wherein moving the one or more magnetic components includes moving a plurality of pins in and out of center regions, the center regions located between conductive electrodes of the plurality of coils, wherein the one or more shapes are based on locations of top ends of the plurality of pins.

18. The method of claim 13, further comprising creating a feeling or movement at a surface of the tactile display by adjusting a control of one or more of shape, stiffness, viscosity, and inertial forces in a lateral direction and a normal direction relative to the surface of the tactile display.

19. The method of claim 18, wherein the created feeling or movement is in response to a force by a user.

* * * * *